Figure 1:
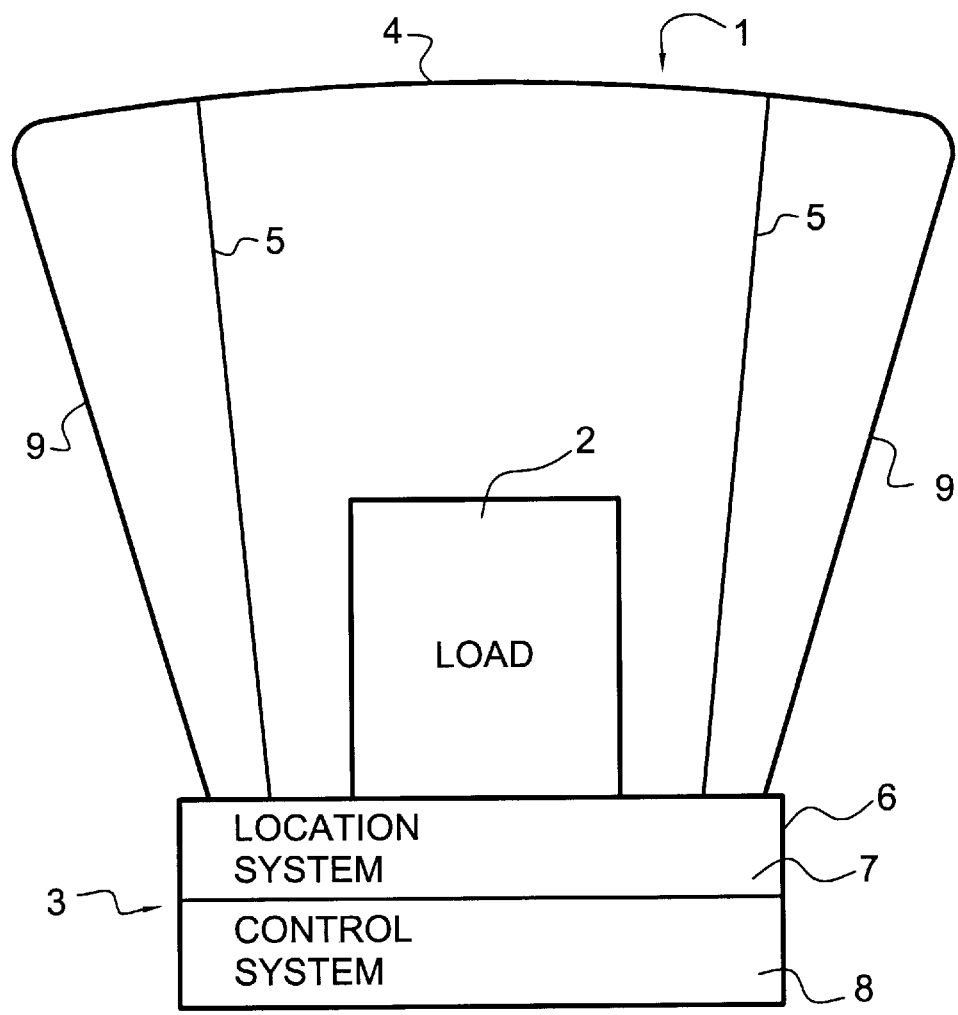

United States Patent
Chopard

[19]

[11] Patent Number: 6,042,056
[45] Date of Patent: Mar. 28, 2000

[54] AIR CARRIER STEERAGE CONTROL DEVICE

[75] Inventor: Jean-Pierre Chopard, Champforgueil, France

[73] Assignee: Delegation Generale pour l'Armement, Armees, France

[21] Appl. No.: 09/011,560

[22] PCT Filed: Jun. 19, 1997

[86] PCT No.: PCT/FR97/01099

§ 371 Date: Mar. 20, 1998

§ 102(e) Date: Mar. 20, 1998

[87] PCT Pub. No.: WO97/48602

PCT Pub. Date: Dec. 24, 1997

[30] Foreign Application Priority Data

Jun. 19, 1996 [FR] France ................. 96 07606

[51] Int. Cl.[7] .............. F42B 10/64; B64D 1/00; B64D 17/34
[52] U.S. Cl. .................................... 244/152
[58] Field of Search ............... 244/152, 142, 244/902, 138 R

[56] References Cited

U.S. PATENT DOCUMENTS

| | | | |
|---|---|---|---|
| 2,730,317 | 1/1956 | Onanian | 244/152 |
| 3,146,976 | 9/1964 | Houdou | 244/152 |
| 3,212,730 | 10/1965 | Tschudy et al. | 244/902 |
| 3,433,441 | 3/1969 | Cummings | 244/152 |
| 4,440,366 | 4/1984 | Keeler et al. | 244/138 R |
| 5,080,305 | 1/1992 | Stencel et al. | 244/152 |

FOREIGN PATENT DOCUMENTS

| | | |
|---|---|---|
| 2433185 | 4/1980 | France . |
| 3517352 | 11/1986 | Germany . |
| 43 36 056 | 4/1995 | Germany . |
| 5-185993 | 7/1993 | Japan . |
| 05319397 | 12/1993 | Japan . |
| 08156893 | 6/1996 | Japan . |
| 2 240 954 | 8/1991 | United Kingdom . |

*Primary Examiner*—Peter M. Poon
*Assistant Examiner*—Francis T. Palo
*Attorney, Agent, or Firm*—Oliff & Berridge, PLC

[57] ABSTRACT

An apparatus and corresponding method, useful for any type of aircraft, aerostat or space vehicle, for controlling a direction of movement of an air carrier includes a source of energy, at least one rudder, at least one actuator acting on the rudder and a control logic for controlling the actuator, wherein the force exerted by the actuator on the rudder is controlled.

10 Claims, 3 Drawing Sheets

AIR CARRIER STEERAGE CONTROL DEVICE

The invention is notably concerned with the field of releasing objects from all types of aircraft, aerostat or spacecraft, and principally about a control procedure for steering an air carrier.

The purpose of the invention is also a control system of an aircraft made of fabric, this being, for example, a fabric air carrier, a kite, balloon or hang glider.

Carrier systems like this are described in patent application n°. DE 43 36 056 and in the Japanese patent n°. JP5185993.

The latter patent describes methods of guiding a parachute towards a predetermined place carrying an electrical power supply, and a regulating circuit which is the length of each control unit shroud line. Each unit has an electric motor linked to a drum or a rack system which is itself linked to the unit, as well as a GPS type location system, and a microprocessor able to compare the parachute's position with a predetermined, pre-recorded trajectory, and in function of this comparison, to control or not the functioning of the electric motors.

This kind of apparatus works properly when the load release takes place at low altitude, for example at 1000 meters. However, for a given size, the higher altitude the release takes place, the more the performance of the apparatus deteriorates. In fact, when the release altitude is higher, the flight time is longer, and the quantity of energy required from the motor is greater. Besides, with the increase in altitude there is a drop in air temperature, reaching a value of around −50° C. At lower temperatures, the efficiency of the supply, such as a battery, of an electric motor is affected. It is therefore necessary to increase the size of the batteries in the case of release at high altitude. In practical terms, for release at 10 000 meters, the mass of the batteries required for the flight can reach up to several hundred kilograms and their volume is obviously in consequence.

This therefore limits the quantity of freight which can be transported and/or requires the use of more resistant material and which is therefore heavy and expensive.

One of the aims of the invention is to correct these problems by proposing an air carrier steering control system, able to function using a source of energy with low mass at any release altitude envisaged.

According to the invention, a control device contains a source of energy, at least a control suspension unit, an activating element which operates the control suspension unit and a control switch for the activating element, and is characterised by the fact that the source of energy is a gas and the activating element is a pneumatic system.

Patent N°. GB 2 240 954 describes a device controlling the position of the rudder units of a missile made up of an energy source with pressurized gas, at least one rudder, one pneumatic actuator operating on the rudder and which includes two chambers and two pistons connected at opposite ends of a lever attached to the rudder, and a circuit controlling the rudder position, made up of notably a rudder position gauge and a method of controlling the position of two valves, one connecting the source of energy and the chamber of the first piston to the chamber of the second piston and the other connecting the chamber of the second piston to the exterior.

The air carrier steering control devices described in the above mentioned patents act on the position of the rudders or on the length of the shroud lines and have the disadvantage of being sensitive to variations in direction and the strength of the wind and not being able to reduce automatically their influence leading to a measurable deviation from the trajectory of the craft compared with the intended trajectory.

Moreover, in the case of aircraft cited in the patent application DE 43 36 056, for their method of operation it is necessary to define, for each control suspension unit, a "zero" reference at which it is released in order either to avoid there being any slack, or to avoid the shroud line being permanently under tension. In addition to this, the length of these control shroud lines must be precisely known. They can be influenced by humidity and temperature as well as by the presence of knots which might form when the canvas opens. The presence of knots creates a lack of symmetry which existing control systems cannot correct.

Another goal of the invention is to overcome these disadvantages by proposing notably a means of control capable of correcting any asymmetry or variation in length of the control shroud lines and ruling out the need for a "zero" reference.

In order to do this, an air carrier steering control device comprises an energy source supplied by pressurized gas, at least one rudder, at least one pneumatic activating device which acts on the rudders, a regulating circuit and is characterized by the fact that the regulating circuit is a circuit regulating the pressure applied to the actuator by the gas.

By rudder, one must understand any mechanical object whose change in position in flight provokes a change in direction of the aircraft.

According to a particular characteristic, the circuit regulating the pressure applied to the actuator by the gas comprises a pressure gauge and the logic associated with it.

According to a particular characteristic which allows automatic piloting of the aircraft, the control system is associated with a means of locating the aircraft and/or the position of the transmitter.

In order to reduce the volume of the control system, the control system has an interface between the pneumatic actuator and the rudders, capable of increasing the stroke of the actuator and/or reducing the effort applied by the actuator to the rudders.

According to a particular characteristic, this system is made up of at least one pulley.

Following another characteristic, the rudders are made up of control shroud lines connected to the trailing edge of a wing.

It is equally known that existing devices which function according to the principal of control of the position of the shroud lines are incapable of reacting to turbulence because they maintain the control shroud lines in a fixed position. This can lead to damage to the wing. The goal of the invention is also to suggest a control procedure suitable for solving this problem.

Thus, a control procedure for steering an air carrier containing a source of energy, at least one rudder, at least one actuator working on the rudders, and a control logic for the actuator, is characterized by the fact that it includes a control stage of the force applied by the actuator to the rudder.

This verification of the force applied by the actuator can be carried out by a circuit regulating the pressure applied to the actuator, the force being equal to the pressure produced by the active surface of the actuator.

Figure 2:
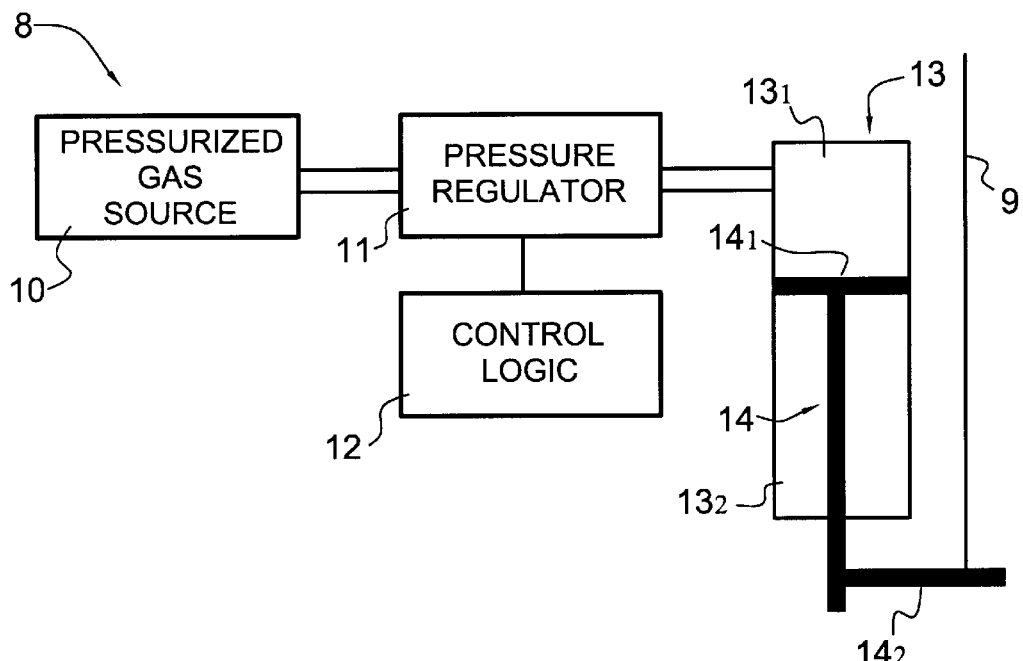
Figure 3:
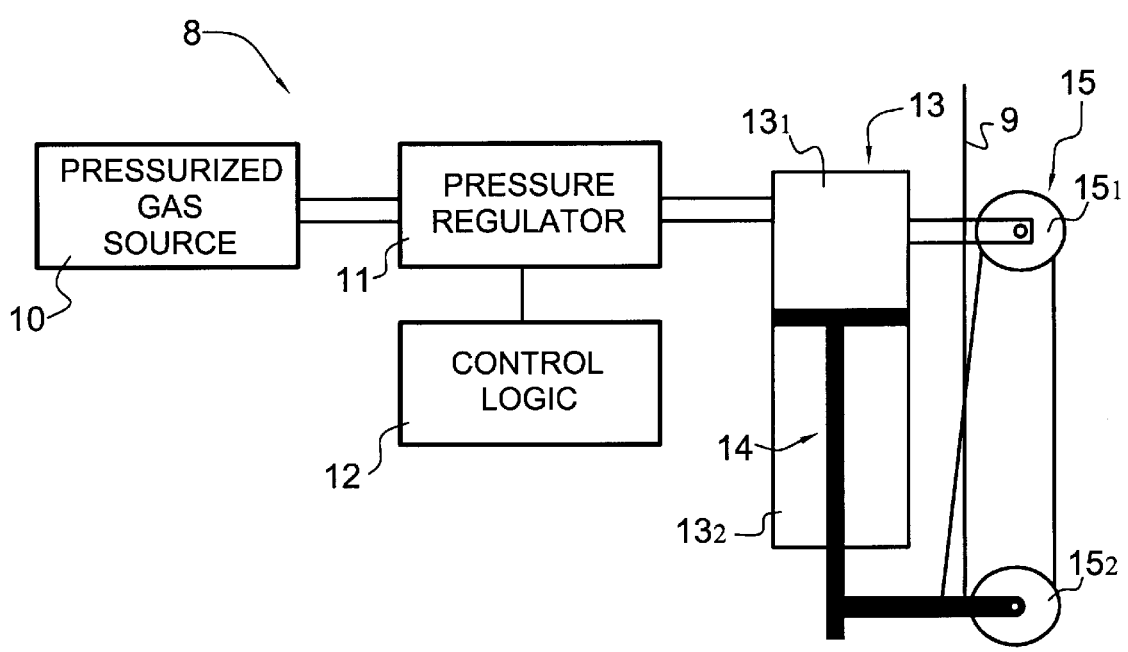
Figure 4:
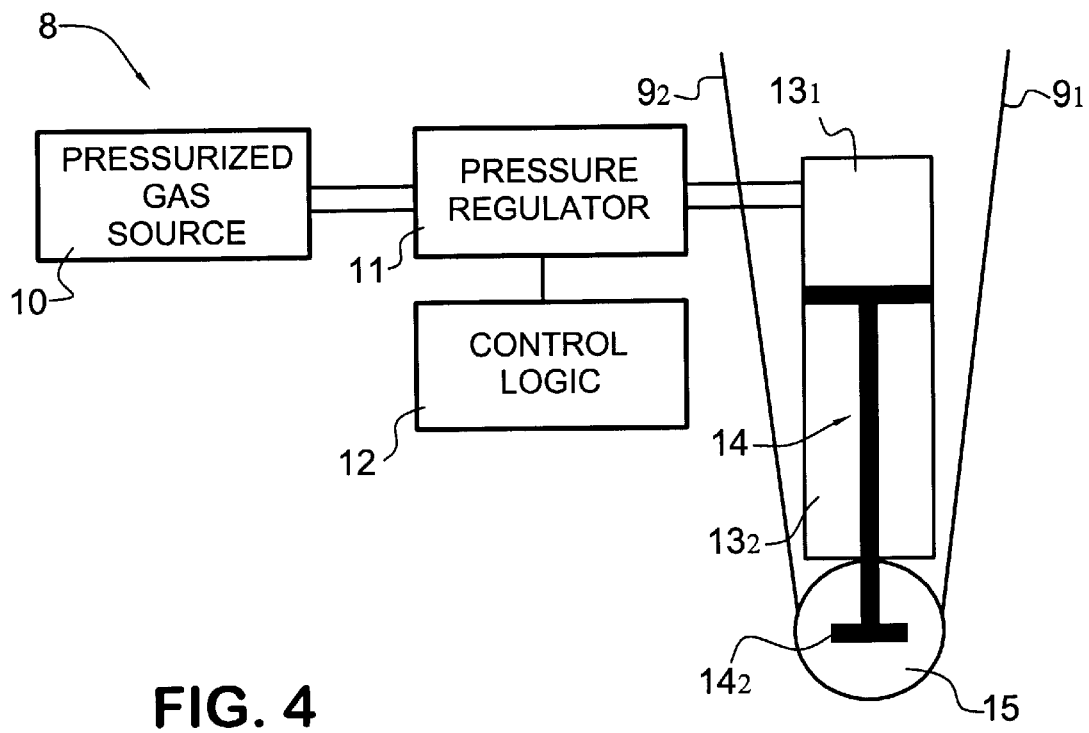
Figure 5:
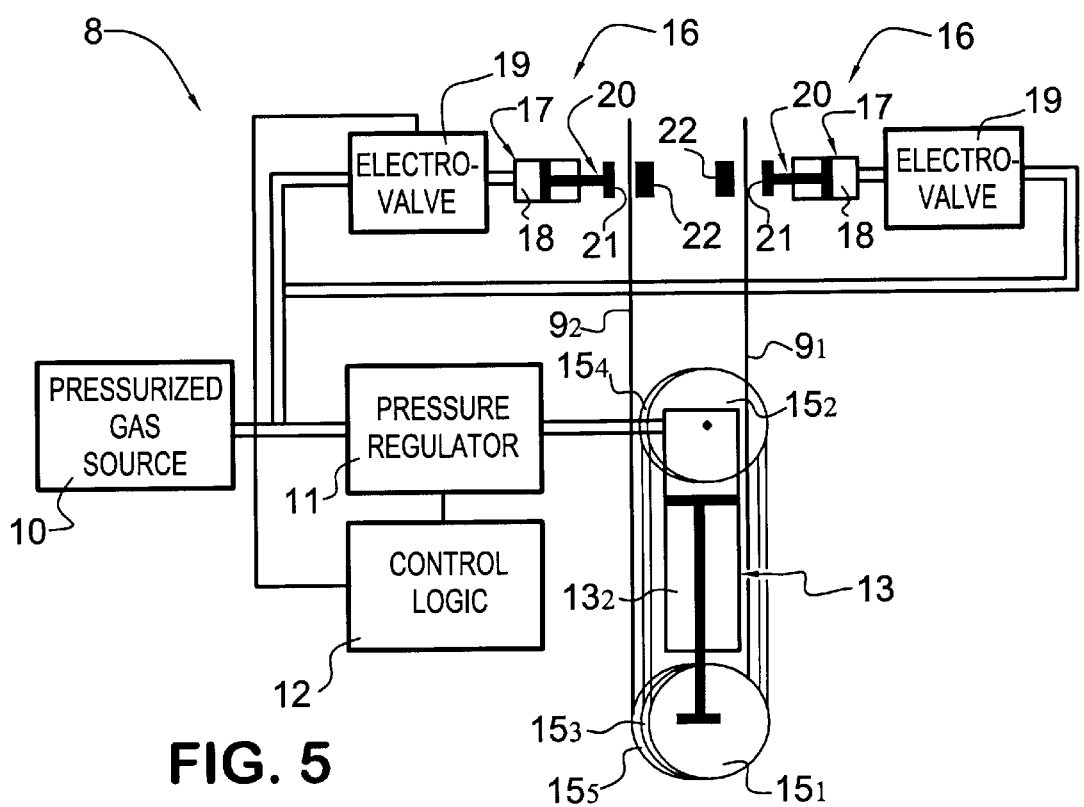

Other advantages and characteristics of this invention will be mentioned in the description of the method of construction of the invention, applied to a carrying device with a canopy, compared with the diagrams in the appendices among which:

FIG. 1 presents a general diagram of a canopied carrying device;

FIG. 2 shows a general diagram of pneumatic controls;

FIG. 3 presents the method of reducing the stroke of a jack;

FIG. 4 lays out in a simplified manner a control device for two shroud lines with a single jack; and FIG. 5 shows a complete diagram of control device for two shroud lines with a single jack.

FIG. 1 presents the principal elements of a releasable load carrying canopy device. This comprises a braking system 1 of a load 2 and a navigation system 3.

The braking system is made up of a canopy 4, shroud lines 5 and a chassis 6 on which the load 2 is placed.

The navigation system 3 comprises, in this example of the design, the location system 7 of the device, the most common being known under the English name of GPS, and the control system 8 for steering the device by the rudders 9.

These rudders 9 are made up of control lines 9, hereafter called controls 9 and generally made up of a group of lines which manipulate the trailing edge of the wing 4.

FIG. 2 shows a simplified diagram of the control system 8 for steering the device according to the invention. It has a source of pressurized gas 10, a circuit 11, control logic 12 for regulating the pressure applied by the gas on the actuator, a pneumatic jack 13 and a control 9. The jack has an active chamber $13_1$, a chamber $13_2$ connected to the open air, these chambers are separated by the base $14_1$ of a piston 14. The head $14_2$ of this piston 14 is connected to the control 9.

The regulating circuit has a pressure regulator 11 and associated control logic 12. They have checking and adjustment elements, the function of these elements being respectively, firstly to read the value of the pressure upstream of the actuator, that of the instructions and that of the difference between the pressure and the instructions, and secondly to adjust the value of the instructions and that of the force applied by the actuator on the rudder.

The pressure regulator 11 and its associated control logic 12 are of recognized types. They are powered by a low voltage battery of reduced size.

As a general rule, the piston stroke is low and, on the other hand, the surface $14_1$ of the piston upon which the pressure is applied is relatively large. As an example, a piston of diameter 63 mm has a surface of 30 cm² and produces, under a pressure of 10 BAR, a force of 300 kg. It is therefore a good idea, for practical reasons, to provide for a means 15 which assure on the one hand the increase in stroke of the jack and on the other the reduction in force, a control system for a standard wing does not require more than 50 kg to be pulled to maximum.

FIG. 3 shows an example of this kind of system 15. It is made up of pulleys $15_1$ and $15_2$ free mounted on the head of the piston and on the barrel of the jack 13. Thus the control 9, fixed to the head $14_2$ of the piston 14, is passed first through the pulley $15_1$ then through pulley $15_2$ and then fixed to the wing 4.

Devices as shown in FIGS. 2 and 3 assure the operation of only one control 9. They must therefore be doubled up to command the actions on controls $9_1$ and $9_2$ respectively left and right of the wing 4.

The device in FIG. 4 allows us to pilot the two right and left controls with a single regulator 11 and a single jack 13. For this, the extremities of the two suspension lines, not attached to the wing, are joined by a cable which runs through the opening of the pulley 15 free mounted on the head $14_2$ of the piston. Thus if the two commands $9_1$ and $9_2$ are free, the effort produced by the jack is applied simultaneously to the two controls, balancing automatically; if, on the other hand, one of the controls is blocked, this effort is only applied to the other control.

It should be noted that, for a pressure P applied to the piston 14, the corresponding effort applied to the controls is the same, if it is applied to one control or both and the jack stroke will be twice as great in the latter case.

It should be noted that having several pulleys instead of just one allows the reduction of the effort applied to the controls 9 by the jack while at the same time increasing the stroke.

FIG. 5 represents a variant of the design of the steering control system 8 of the device by the action on the controls 9 permitting:

the control of elements $9_1$ and $9_2$ left and right with a single regulator 11 and a single jack 13, the increase of the stroke of the jack and the reduction of the effort applied to the controls $9_1$ and $9_2$, the presence of systems capable of sending the effort to only one of the two controls $9_1$ or $9_2$.

These control systems 8 are made up of, as previously mentioned, a source of pressurized gas 10, a pressure regulator 11 controlled by the control logic 12, a pneumatic jack 13 and the pulleys 15 free mounted respectively on the head of the piston 14 and on the cylinder of the jack 13. There are five pulleys, $15_1$, $15_2$, $15_3$, $15_4$, $15_5$ thus offering a dividing factor of six. The two controls 9 are connected by a cable which passes in the opening of each of the pulleys.

There is also a system 16 which blocks the controls $9_1$ or $9_2$. The latter are made up of two identical units, respectively left and right. Each unit contains a jack 17 whose active chamber 18 is powered under pressure by an electro-valve 19 from a high pressure circuit from the energy source 10. The piston 20 of this jack presses on a brake block 21 placed opposite another fixed brake block which is part of the cylinder of the jack, the corresponding shroud line passes between the two brake blocks 21 and 22.

Just like the pressure regulator 11, the electro-valve 19 of each of these two units is controlled by the control logic 12.

With regards to FIG. 5, the device works as follows:

In the case where the landing site does not have an emitter, the co-ordinates are programmed, before drop off, into the control logic 12. The device is then released at an altitude high enough to allow it to reach the landing site. Navigation management is then carried out using a recognized software and using information given by the location system 7 and by activating the control $9_1$ or $9_2$.

Within the framework of the invention, the control system $9_1$ and $9_2$ have a source of gas, a pneumatic jack acting on the given elements and a control logic 12. Thus the command procedure for steering the device consists of controlling constantly the pressure applied to the jack piston and therefore the effort applied to the above elements $9_1$ and $9_2$.

When the control logic finds that the load must change direction, for example to the right, it controls the opening, on the left side, of the electro-valve 19. The pressurized gas, coming from the energy source 10, therefore causes the piston 20 to move, and therefore the brake block 21 moves against the fixed brake block 22, which blocks the left hand control $9_2$.

The control logic 12 increases the pressure instruction on the regulator 11 up to a certain value, to which a value of force put upon the controls 9 corresponds. The increase in pressure resulting downstream from this causes the jack 13 to move and the same force to be applied.

The left hand shroud line being blocked, the force applied by the piston on the controls is entirely transmitted to the right control and results in the device turning to the right. The control logic 12, which has for example, a magnetic compass linked to it to determine the angle of the turn, controls a return of the instruction point of the pressure regulator to the original level and then the unblocking of the control, via the electro-valve 19.

It is to be noted that the traction movement on the control 9 due to the pressure applied on the piston 14 of the jack 13 is limited by the opposing effort exerted by the canopy 4 on the control 9; because of this, if the control 9 is slack, this slack is taken up automatically, a zero reference being therefore no longer necessary. Furthermore, in case of turbulence, the jack 13 functions like a shock absorber, the control pressure, and therefore the effort applied to the controls remain measurably stable.

Furthermore, if there is a knot in the control line, the maneuvers are carried out through effort and not position as in existing systems, the action obtained on the control remains the same; the adding of the pulley system described above allows us to ensure that the controls are symmetric, even if there is a large knot in either one of them.

Moreover, the mass of the pressurized gas necessary for this system to work is very small; thus 12 liters of nitrogen at 200 BAR has a mass of around 2 kg and gives the device an autonomy of several hours.

Of course, numerous changes can be brought to the example of the design described above without leaving the framework of the invention.

In a variation, the number of pulleys can be five (1+2×2) fixed on the cylinder barrel and four (2×2) on the piston head, these pulleys being separated into two groups, left and right, of two pulleys placed to the left of the cylinder, one above the cylinder, positioned flat, and two groups of two pulleys to the right and left of the piston head; this organization has the advantage of balancing the lateral forces on the piston head and to allow it to work within the axis, without any buckling stresses.

I claim:

1. An air carrier steerage control device comprising:
   an energy source comprising a pressurized gas;
   at least one control shroud line;
   at least one actuator acting upon the control line; and
   at least one control logic of the actuator, wherein the energy source is made up of a gas and the actuator is pneumatic.

2. An air carrier steerage control device comprising:
   an energy source comprising a pressurized gas;
   at least one rudder;
   at least one pneumatic actuator which acts upon the rudder and a regulating circuit comprising a pressure regulator and associated control logic, wherein the regulating circuit determines a pressure upstream of the actuator in order to regulate the pressure exerted by the gas upon the actuator.

3. The device according to any one of claim 1 or 2, wherein the control logic is associated to a means for determining location.

4. The device according to claim 1, further comprising a system for reducing a stroke of the pneumatic actuator.

5. The device according to claim 4, further comprising a system for reducing an effort exerted by the actuator on the rudders.

6. The device according to claim 5, wherein the system comprises pulleys.

7. The device according to claim 1 wherein the rudders comprise control shroud lines attached to a trailing edge of a canvas wing.

8. The device according to claim 7, further comprising a single pneumatic actuator and a blocking system for the shroud lines.

9. The device according to claim 8, wherein the blocking system includes, for each shroud line, an actuator comprising a brake block and a fixed brake block.

10. A control procedure for steering an air carrier comprising an energy source, at least one rudder at least one actuator which acts on the rudder, and a control logic for the actuator, the control procedure comprising the steps of:
    (a) determining a pressure of the pressurized gas upstream of the actuator;
    (b) regulating the pressure exerted by the pressurized gas on the actuator in order to control the force applied by the actuator on the rudder independently of a position of the rudder.

* * * * *